United States Patent
Grufman et al.

(10) Patent No.: US 10,338,602 B2
(45) Date of Patent: Jul. 2, 2019

(54) MULTI-SENSOR, AUTONOMOUS ROBOTIC VEHICLE WITH MAPPING CAPABILITY

(71) Applicant: HUSQVARNA AB, Huskvarna (SE)

(72) Inventors: Stefan Grufman, Bankeryd (SE); Björn Mannefred, Huskvarna (SE); Hans Forsberg, Sävdalen (SE)

(73) Assignee: HUSQVARNA AB, Huskvarna (SE)

( * ) Notice: Subject to any disclaimer, the term of this patent is extended or adjusted under 35 U.S.C. 154(b) by 22 days.

(21) Appl. No.: 15/533,223

(22) PCT Filed: Dec. 17, 2015

(86) PCT No.: PCT/IB2015/059735
§ 371 (c)(1),
(2) Date: Jun. 5, 2017

(87) PCT Pub. No.: WO2016/098050
PCT Pub. Date: Jun. 23, 2016

(65) Prior Publication Data
US 2017/0364090 A1    Dec. 21, 2017

Related U.S. Application Data

(60) Provisional application No. 62/093,041, filed on Dec. 17, 2014.

(51) Int. Cl.
*G05D 1/02*    (2006.01)
*G01S 19/13*   (2010.01)

(52) U.S. Cl.
CPC ............ *G05D 1/0274* (2013.01); *G01S 19/13* (2013.01); *G05D 1/0214* (2013.01); *G05D 2201/0208* (2013.01)

(58) Field of Classification Search
CPC ..... G05D 1/0274; G05D 1/0214; G01S 19/13
See application file for complete search history.

(56) References Cited

U.S. PATENT DOCUMENTS

| | | | |
|---|---|---|---|
| 5,363,305 A | 11/1994 | Cox et al. | |
| 7,251,548 B2 | 7/2007 | Herz et al. | |
| 2004/0073337 A1 | 4/2004 | McKee et al. | |
| 2004/0210359 A1 | 10/2004 | Herz et al. | |
| 2005/0182518 A1 | 8/2005 | Karlsson | |
| 2008/0009967 A1* | 1/2008 | Bruemmer | G05D 1/0088 700/245 |

(Continued)

FOREIGN PATENT DOCUMENTS

| DE | 102007060056 A1 | 6/2009 |
|---|---|---|
| EP | 2495632 A1 | 9/2012 |

(Continued)

OTHER PUBLICATIONS

International Search Report and Written Opinion for International Application No. PCT/IB2015/059735 dated Mar. 8, 2016.

(Continued)

*Primary Examiner* — Calvin Cheung
(74) *Attorney, Agent, or Firm* — Burr Forman McNair

(57) ABSTRACT

A method for recording data from at least one sensor of a robotic vehicle responsive to the robotic vehicle transiting a portion of a parcel and determining a confidence score associated with the recorded data for each of a plurality of potential detection events. The confidence score may correspond to a probability that the recorded data corresponds to an object or feature. The method may further include generating map data comprising one or more objects or features correlated to potential detection events based at least in part on the confidence score of the respective objects or features.

16 Claims, 8 Drawing Sheets

(56) References Cited

U.S. PATENT DOCUMENTS

| | | |
|---|---|---|
| 2011/0150348 A1* | 6/2011 | Anderson ............ G05D 1/0088 382/224 |
| 2011/0190931 A1 | 8/2011 | Anderson et al. |
| 2012/0083982 A1 | 4/2012 | Bonefas et al. |
| 2012/0213443 A1 | 8/2012 | Shin et al. |
| 2014/0129027 A1 | 5/2014 | Schnittman |
| 2014/0214255 A1 | 7/2014 | Dolgov et al. |
| 2015/0250097 A1 | 9/2015 | Jagenstedt et al. |
| 2016/0165795 A1 | 6/2016 | Balutis et al. |
| 2017/0255203 A1 | 9/2017 | Sofman et al. |
| 2018/0168097 A1 | 6/2018 | Yamauchi et al. |
| 2018/0284806 A1 | 10/2018 | Einecke et al. |

FOREIGN PATENT DOCUMENTS

| | | |
|---|---|---|
| WO | 03014852 A1 | 2/2003 |
| WO | 2011026119 A2 | 3/2011 |
| WO | 2014058358 A1 | 4/2014 |

OTHER PUBLICATIONS

International Search Report and Written Opinion for International Application No. PCT/IB2015/058905 dated Mar. 11, 2016.
International Preliminary Report on Patentability for International Application No. PCT/IB2015/059735 dated Jun. 20, 2017.
International Preliminary Report on Patentability for International Application No. PCT/IB2015/058905 dated Jun. 20, 2017.
Se.Stephen et al., "Mobile Robot Localization and Mapping with Uncertainty using Scale-Invariant Visual Landmarks", International Journal of Robotics Research, Sage Science Press, Thousand Oaks, US, vol. 21, Issue No. 8, pp. 735-758, Aug. 31, 2002.
Sooyong, L. and Chung, W-K.,"Rotating IR Sensor System for 2.5D Sensing", 2006 IEEE/RSJ International Conference on Intelligent Robots and Systems, Oct. 2006, pp. 814-819 (See Abstract).

* cited by examiner

MULTI-SENSOR, AUTONOMOUS ROBOTIC VEHICLE WITH MAPPING CAPABILITY

CROSS REFERENCE TO RELATED APPLICATIONS

The present application claims priority to U.S. patent application No. 62/093,041 filed Dec. 17, 2014, which is expressly incorporated by reference in its entirety.

TECHNICAL FIELD

Example embodiments generally relate to robotic vehicles and, more particularly, relate to a robotic vehicle that is configurable to generate a map of an area responsive to operating in the area.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically confined to operating on a parcel of land that is bounded by some form of boundary wire. The robotic mower is capable of detecting the boundary wire and operating relatively autonomously within the area defined by the boundary wire. However, the laying of the boundary wire can be a time consuming and difficult task, which operators would prefer to avoid, if possible. That said, to date it has been difficult to try to provide a robotic mower that can truly operate without any need for a boundary wire. Limitations on the accuracy of positioning equipment have played a large role in making this problem difficult to solve.

Additionally, even if it were possible to accurately determine vehicle position, there is currently no comprehensive way to ensure that the robotic vehicle only services the specific areas of a garden or yard that are actually desired for servicing. Given that computing devices are becoming more ubiquitous, it is to be expected that they may be employed to assist in operation of lawn mowers. As such, many additional functionalities may be provided or supported by the employment of computing devices on lawn mowers.

BRIEF SUMMARY OF SOME EXAMPLES

Some example embodiments may therefore provide a robotic vehicle that is configured to incorporate multiple sensors to make the robotic vehicle capable of generating reliable and quality maps of an area. In this regard, in some cases, the robotic vehicle may include an onboard vehicle positioning module, a detection module, and a mapping module that may work together to give the robotic vehicle a comprehensive understanding of its current location and of the features or objects located in its environment. Moreover, the robotic vehicle may include sensors that enable the modules to collect and process data that can be used to generate an accurate map of a parcel on which the robotic vehicle operates.

Some example embodiments may improve the ability of operators and/or fleet managers to make lawn mowers operate safely and/or efficiently.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
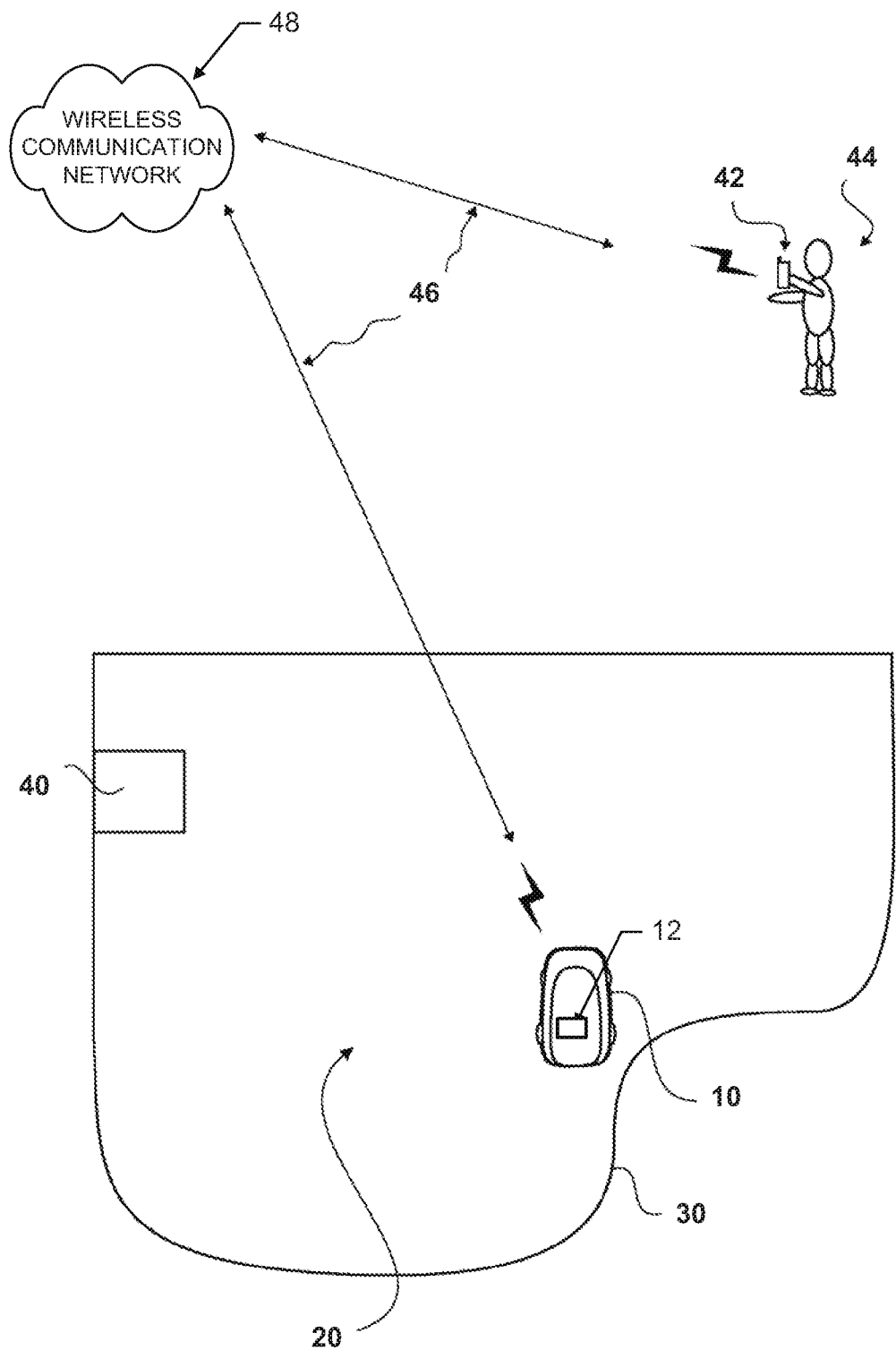
FIG. 1 illustrates an example operating environment for a robotic mower.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

Robotic mowers, which are one example of a robotic vehicle of an example embodiment, typically mow an area that is defined by a boundary wire that bounds the area to be mowed. The robotic mower then roams within the bounded area to ensure that the entire area is mowed, but the robotic mower does not go outside of the bounded area. Example embodiments are therefore described herein to provide various structural and control-related design features that can be employed to improve the capabilities of robotic vehicles (e.g., robotic mowers, mobile sensing devices, watering devices and/or the like) to be expanded and employed in an intelligent manner. Other structures may also be provided and other functions may also be performed as described in greater detail below.

A robotic vehicle (e.g., a robotic mower) of an example embodiment may therefore be provided that can operate without physical boundary wires and yet still stay within boundaries that can be defined by any of a number of different ways. However, further still, a robotic vehicle of an example embodiment may actually be enabled to generate a map of its environment using accurate sensors and techniques described herein. By enabling the robotic vehicle to accurately determine its position and experience its surroundings in a more advanced way, some example embodiments may greatly expand the capabilities and the performance of robotic vehicles relative to generating and interacting with maps.

FIG. 1 illustrates an example operating environment for a robotic mower 10 that may be employed in connection with an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), or programmed location based boundaries or combinations thereof. When the boundary 30 is a detected, by any suitable means, the robotic mower 10 may be informed so that it can operate in a manner that prevents the robotic mower 10 from leaving or moving outside the boundary 30.

The robotic mower 10 may be controlled, at least in part, via control circuitry 12 located onboard. The control circuitry 12 may include, among other things, a positioning module and a sensor module, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor module may detect objects and/or gather data regarding the surroundings of the robotic mower 10 while the parcel 20 is traversed.

If a sensor module is employed, the sensor module may include a sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system and blades.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10 or may receive data indicative or related to the operation of the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2:
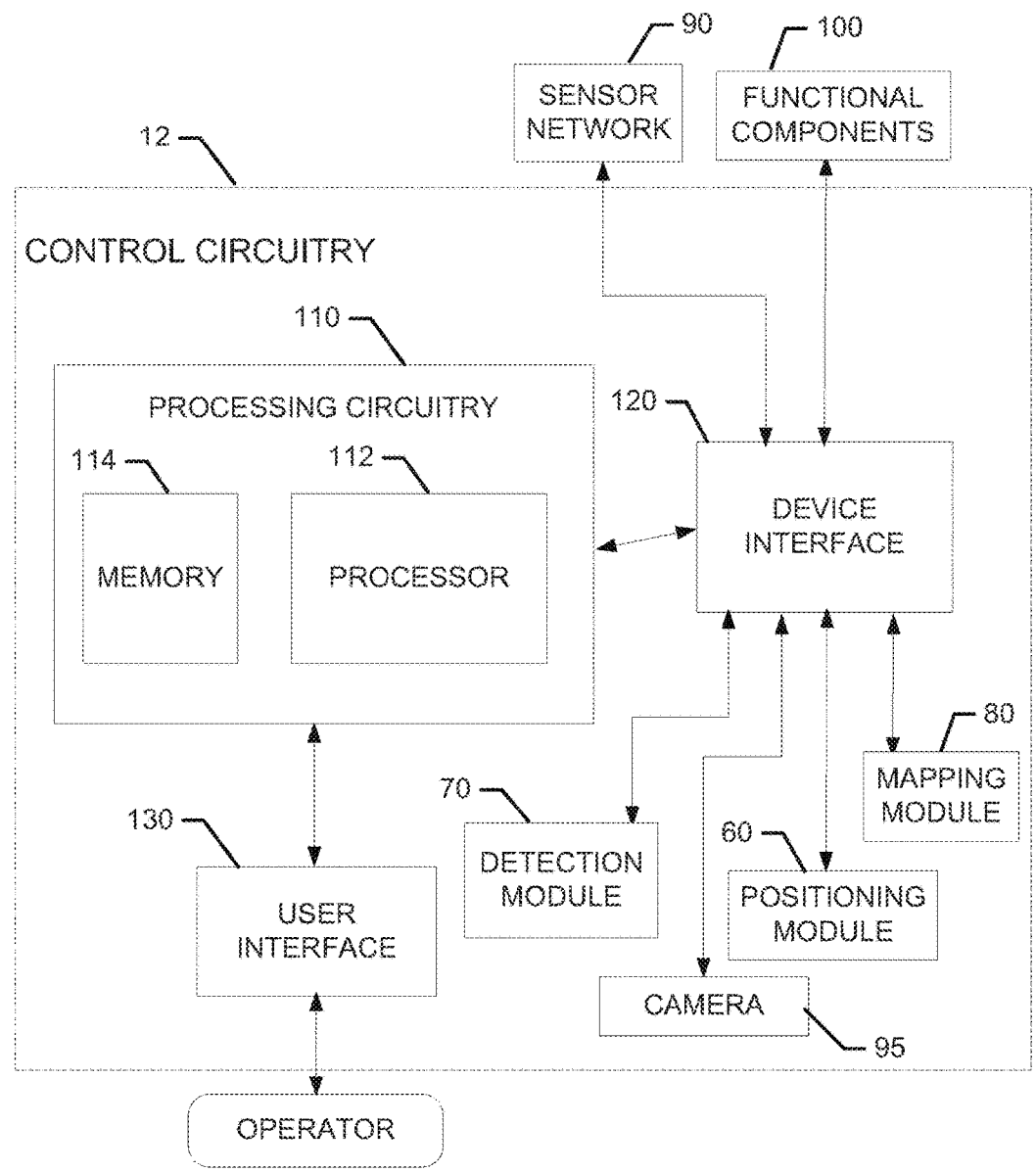
FIG. 2 illustrates a block diagram of various components of control circuitry to illustrate some of the components that enable or enhance the functional performance of the robotic mower and to facilitate description of an example embodiment.

FIG. 2 illustrates a block diagram of various components of the control circuitry 12 to illustrate some of the components that enable or enhance the functional performance of the robotic mower 10 and to facilitate description of an example embodiment. In some example embodiments, the control circuitry 12 may include or otherwise be in communication with a vehicle positioning module 60, a detection module 70 (e.g., for detecting objects, borders and/or the like), and a mapping module 80. As mentioned above, the vehicle positioning module 60, the detection module 70, and the mapping module 80 may work together to give the robotic mower 10 a comprehensive understanding of its environment, and enable it to be operated autonomously without boundary wires.

Any or all of the vehicle positioning module 60, the detection module 70, and the mapping module 80 may be part of a sensor network 90 of the robotic mower 10. However, in some cases, any or all of the vehicle positioning module 60, the detection module 70, and the mapping module 80 may be in communication with the sensor network 90 to facilitate operation of each respective module.

In some examples, one or more of the vehicle positioning module 60, the detection module 70, and the mapping module 80 may further include or be in communication with a camera 95 other imaging device. The camera 95 may be a part of the sensor network 90, part of any of the modules described above, or may be in communication with one or more of the modules to enhance, enable or otherwise facilitate operation of respective ones of the modules. The camera 95 may include an electronic image sensor configured to store captured image data (e.g., in memory 114). Image data recorded by the camera 95 may be in the visible light spectrum or in other portions of the electromagnetic spectrum (e.g., IR camera). In some cases, the camera 95 may actually include multiple sensors configured to capture data in different types of images (e.g., RGB and IR sensors). The camera 95 may be configured to capture still images and/or video data. In some cases, the camera 95 may be part of a camera module including one or more individual cameras.

The robotic mower 10 may also include one or more functional components 100 that may be controlled by the control circuitry 12 or otherwise be operated in connection with the operation of the robotic mower 10. The functional components 100 may include a wheel assembly (or other mobility assembly components), one or more cutting blades and corresponding blade control components, and/or other such devices. In embodiments where the robotic vehicle is not a mower, the functional components 100 may include equipment for taking soil samples, operating valves, distributing water, seed, powder, pellets or chemicals, and/or other functional devices and/or components.

The control circuitry 12 may include processing circuitry 110 that may be configured to perform data processing or control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of the robotic mower 10 via a single data bus. As such, the data bus may connect to a plurality or all of the switching components, sensory components and/or other electrically controlled components of the robotic mower 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the vehicle positioning module 60, the detection module 70, and the mapping module 80. As such, in some embodiments, the processor 112 (or the processing circuitry 110) may be said to cause each of the operations described in connection with the vehicle positioning module 60, the detection module 70, and the mapping module 80 by directing the vehicle positioning module 60, the detection module 70, and the mapping module 80, respectively, to undertake the corresponding functionalities responsive to execution of instructions or algorithms configuring the processor 112 (or processing circuitry 110) accordingly. These instructions or algorithms may configure the processing circuitry 110, and thereby also the robotic mower 10, into a tool for driving the corresponding physical components for performing corresponding functions in the physical world in accordance with the instructions provided.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the vehicle positioning module 60, the detection module 70, and the mapping module 80 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from various sensors or components of the robotic mower 10. Among the contents of the memory 114, applications may be stored for execution by the processor 112 in order to carry out the functionality associated with each respective application.

The applications may include applications for controlling the robotic mower 10 relative to various operations including determining an accurate position of the robotic mower 10 (e.g., using one or more sensors of the vehicle positioning module 60). Alternatively or additionally, the applications may include applications for controlling the robotic mower 10 relative to various operations including determining the existence and/or position of obstacles (e.g., static or dynamic) and borders relative to which the robotic mower 10 must navigate (e.g., using one or more sensors of the detection module 70). Alternatively or additionally, the applications may include applications for controlling the robotic mower 10 relative to various operations including mapping a parcel or operating the robotic mower 10 relative to a map (generated or provided) (e.g., using one or more sensors of the mapping module 80). Alternatively or additionally, the applications may include applications for controlling the camera 95 and/or processing image data gathered by the camera 95 to execute or facilitate execution of other applications that drive or enhance operation of the robotic mower 10 relative to various activities described herein.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons), and/or other input/output mechanisms (e.g., microphone, speakers, cursor, joystick, lights and/or the like).

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to sensors or other components in communication with the processing circuitry 110. In some example embodiments, the device interface 120 may provide interfaces for communication of data to/from the control circuitry 12, the vehicle positioning module 60, the detection module 70, the mapping module 80, the sensor network 90, the camera 95 and/or other functional components 100 via wired or wireless communication interfaces in a real-time manner, as a data package downloaded after data gathering or in one or more burst transmission of any kind.

Each of the vehicle positioning module 60, the detection module 70, and the mapping module 80 may be any means such as a device or circuitry embodied in either hardware, or a combination of hardware and software that is configured to perform the corresponding functions described herein. Thus, the modules may include hardware and/or instructions for execution on hardware (e.g., embedded processing circuitry) that is part of the control circuitry 12 of the robotic mower 10. The modules may share some parts of the hardware and/or instructions that form each module, or they may be distinctly formed. As such, the modules and components thereof are not necessarily intended to be mutually exclusive relative to each other from a compositional perspective.

The vehicle positioning module 60 (or "positioning module") may be configured to utilize one or more sensors (e.g., of the sensor network 90) to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and/or provide full coverage of the parcel 20 to ensure the entire parcel is mowed (or otherwise serviced). The vehicle positioning module 60 may therefore be configured to direct movement of the robotic mower 10, including the speed and direction of the robotic mower 10. The vehicle positioning module 60 may also employ such sensors to attempt to determine an accurate current location of the robotic mower 10 on the parcel 20 (or generally).

Various sensors of sensor network 90 of the robotic mower 10 may be included as a portion of, or otherwise communicate with, the vehicle positioning module 60 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the vehicle positioning module 60.

In an example embodiment, the detection module 70 may be configured to utilize one or more sensors (e.g., of the sensor network 90) to detect objects and/or boundaries that are located in the area around the robotic mower 10 to enable the robotic mower 10 to identify the objects or boundaries without physically contacting them. Thus, the detection module 70 may enable object avoidance as well as allow the robotic mower 10 to avoid contact with boundaries, buildings, fences, and/or the like while covering the parcel 20. As such, the robotic mower 10 (or more specifically, the control circuitry 12) may object/boundary detection information to alter a mower track and/or report impediments to providing full coverage of the parcel 20. The detection module 70 may therefore be configured to detect static (i.e., fixed or permanent) and/or dynamic (i.e., temporary or moving) objects in the vicinity of the robotic mower 10. In some cases, the detection module 70 may be further configured to classify or identify the objects detected (e.g., by type, as known or unknown, as static or dynamic objects, as specific objects, and/or the like). Moreover, in some cases, the detection module 70 may interact with the vehicle positioning module 60 to utilize one or more objects to facilitate positioning or boundary definition for the robotic mower 10.

Various sensors of sensor network 90 of the robotic mower 10 may be included as a portion of, or otherwise communicate with, the detection module 70 to, for example, determine the existence of objects, determine range to objects, determine direction to objects, classify objects, and/or the like.

In an example embodiment, the mapping module 80 may be configured to utilize one or more sensors (e.g., of the sensor network 90) to generate a map of the parcel 20, or to facilitate operation of the robotic mower 10 relative to an existing (or previously generated) map of the parcel 20. Thus, the mapping module 80 may include components that enable a map to be generated from sensor data gathered by the robotic mower 10 responsive to movement of the robotic mower 10 about the parcel 20. Alternatively or additionally, the mapping module 80 may enable the robotic mower 10 to understand or orient itself relative to an existing map. Thus, for example, the mapping module 80 may enable data gathered to be used to generate a map or may enable such data to be correlated to map data to allow the robotic mower 10 to reconcile its position with a map. Various sensors of sensor network 90 of the robotic mower 10 may be included as a portion of, or otherwise communicate with, the mapping module 80 to, for example, build a graphical display of the parcel 20 and the various objects, boundaries, zones or other differentiating features of the parcel 20 so that the graphical display can be used for future operation or current operation of the robotic mower 10, or to facilitate the consumption of data that may be correlated to various map locations.

Figure 3:
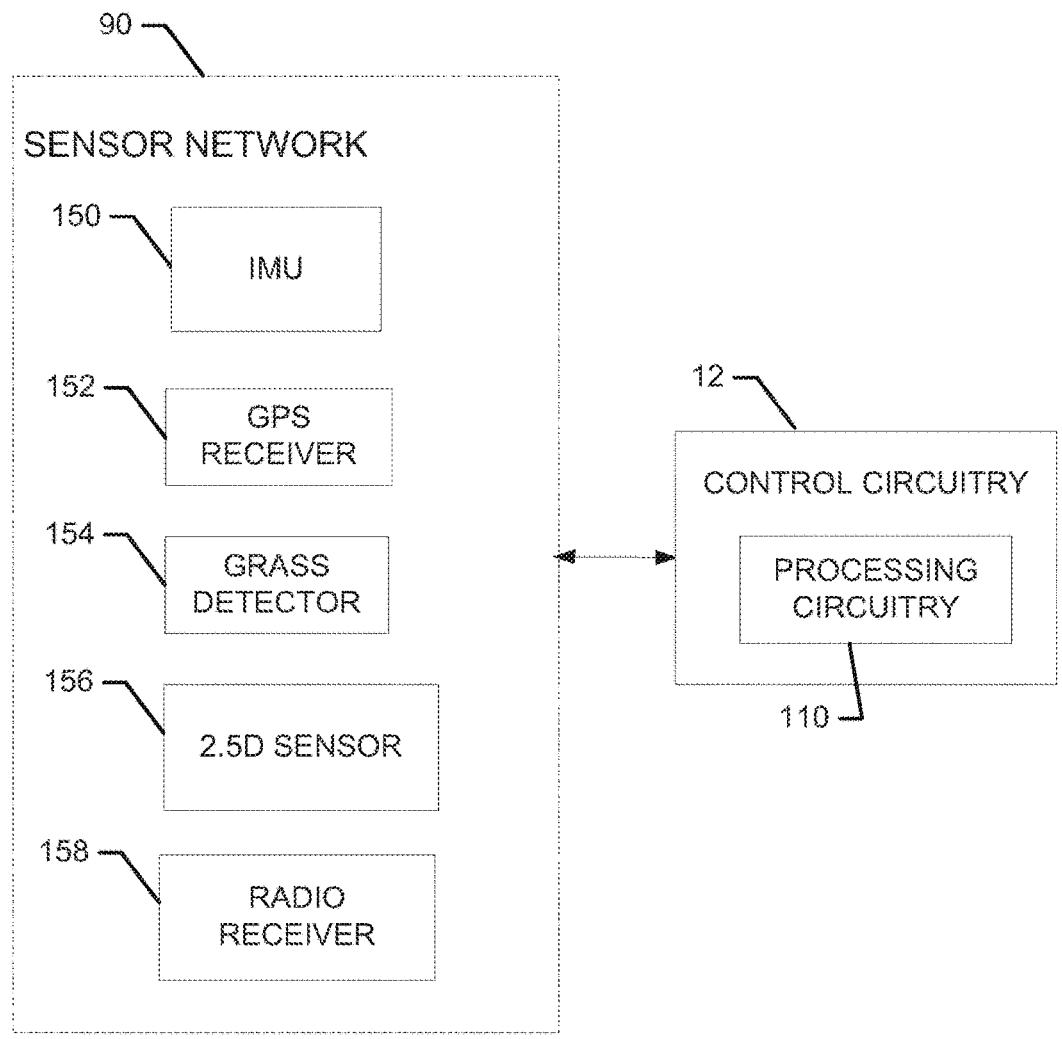
FIG. 3 illustrates a block diagram of some components that may be employed as part of a sensor network in accordance with an example embodiment.

In an example embodiment, the sensor network 90 may provide data to the modules described above to facilitate execution of the functions described above, and/or any other functions that the modules may be configurable to perform. In some cases, the sensor network 90 may include (perhaps among other things) any or all of inertial measurement unit (IMU) 150, a GPS receiver 152, a grass detector 154, a 2.5D sensor 156, and a radio receiver 158, as shown in FIG. 3. In this regard, FIG. 3 illustrates a block diagram of some components that may be employed as part of the sensor network 90 in accordance with an example embodiment.

The sensor network 90 may include independent devices with on-board processing that communicate with the processing circuitry 110 of the control circuitry 12 via a single data bus, or via individual communication ports. However, in some cases, one or more of the devices of the sensor network 90 may rely on the processing power of the processing circuitry 110 of the control circuitry 12 for the performance of their respective functions. As such, in some cases, one or more of the sensors of the sensor network 90 (or portions thereof) may be embodied as portions of the mapping module 80, the detection module 70, and/or the positioning module 60, and any or all of such sensors may employ the camera 95.

The IMU 150 may include one or more and any or all of combinations of accelerometers, odometers, gyroscopes, magnetometers, compasses, and/or the like. As such, the IMU 150 may be configured to determine velocity, direction, orientation and/or the like so that dead reckoning and/or other inertial navigation determinations can be made by the control circuitry 12. The IMU 150 may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic mower 10 relative to a known location. For example, navigation conducted via the IMU 150 may be used for robotic mower 10 operation for a period of time, and then a correction may be inserted when a GPS fix is obtained on robotic mower position. As an example alternative, the IMU 150 determined position may be updated every time the robotic mower 10 returns to the charge station 40 (which may be assumed to be at a fixed location). In still other examples, known reference points may be disposed at one or more locations on the parcel 20 and the robotic mower 10 may get a fix relative to any of such known reference points when the opportunity presents itself. The IMU 150 determined position may then be updated with the more accurate fix information.

In some embodiments, the GPS receiver 152 may be embodied as a real time kinematic (RTK)—GPS receiver. As such, the GPS receiver 152 may employ satellite based positioning in conjunction with GPS, GLONASS, Galileo, GNSS, and/or the like to enhance accuracy of the GPS receiver 152. In some cases, carrier-phase enhancement may be employed such that, for example, in addition to the information content of signals received, the phase of the carrier wave may be examined to provide real-time corrections that can enhance accuracy.

The grass detector 154 may be configured to detect grass using any of a variety of different detection methods related to the particular features that the grass detector 154 is configured to perceive. In this regard, the grass detector 154 may be configured to detect grass based on structural and configured components that able to perceive chlorophyll, specific colors, and/or structures that may be used to indicate grass.

As mentioned above, in some cases, the grass detector 154 may be embodied as a chlorophyll detector. A chlorophyll detector may be a tube that emits light from an LED at a specific wavelength (e.g., 660 nm and 940 nm) to measure reflected light. A normalized difference vegetation index (NVDI) algorithm may then be employed to analyze the reflected light to determine if chlorophyll is present. If chlorophyll is present for a down-looking tube, it may be assumed that the robotic mower 10 is over grass instead of over asphalt, concrete, wood, stone, gravel or other possible surfaces over which the robotic mower 10 may transit in the parcel 20.

If the grass detector 154 is instead configured to identify grass based on passively receiving image data and analyzing the image data for colors in the images to distinguish grass from other materials, if possible. In some cases, the camera 95 may be used to capture image data. The image data may include RGB values for various pixels in each image. The RGB values may be transformed into hue, saturation and value (HSV) parameters. A center hue and width may be defined, and saturation and value thresholds could be computed. A determination as to whether a particular area is grass may then be determined based on a comparison of saturation and value parameters to the thresholds. In some cases, the camera 95 may also capture IR information and both RGB and IR values can be analyzed for color based grass detection.

In some cases, as an alternative to (or in addition to) using color, structure (and/or elevation) may be used to facilitate detection of grass. In this regard, when analyzed in an image, the structure of grass is such that it appears to be more random than other structures such as, for example, leaves, stones, branches or other objects of at least a certain size. Thus, for example, an edge detection algorithm could be employed to identify edges in images (e.g., via filtering), and then for each edge-pixel, calculate the distance to other edges nearby. If the edge distance calculation is small, then there are a lot of edges and the material being analyzed may be grass. If the edge distance calculation is large, then the material is likely not grass. In some embodiments, it may be possible to measure edges distinctly in vertical and horizontal directions (or at least in orthogonally different directions). If short edges are close, and long edges are not, again, the material may be grass. It should be noted, however, that small sticks, pine needles and some other structures may also exhibit a large number of edges. Accordingly, it may still be desirable to incorporate some form of color analysis to improve accuracy of a grass detector that employs structure analysis. Additionally or alternatively, the data may be converted to the frequency domain (e.g., via FFT followed by low or high pass filtering) to detect grass structures based on randomness.

In some examples, the grass detector 154 may be configured to employ the camera 95 to gather image data for comparison to other, known images. In such an example, the processing circuitry 110 (or the grass detector's own processing circuitry) may be configured to employ machine learning to consider a set of n samples of data and then try to predict properties of unknown data. In practice, the grass detector 154 may utilize a plurality of images of grass and other images that include materials other than grass to sort the images as grass or not grass to define a "vocabulary". Test images may then be compared against the vocabulary to identify whether the test images likely include grass or not. As such, for example, in some cases feature extraction may be employed to create a vocabulary of features using "K nearest neighbor". Classifiers may then be trained on a training set to check features in an image for their closes clusters in the vocabulary. A histogram of responses may then be created for each image relative to words in the vocabulary. A sample-label dataset may then be created for the training. The classifier can then provide a classification for a test image.

As mentioned above, the sensor network 90 may also include a 2.5D sensor 156. The 2.5D sensor 156 may be configured to gather data by active transmission of RF, light, or sound energy and then measuring reflected energy received. In some cases, time of flight measurements may be made to determine range (and bearing or angle) to the objects around the 2.5D sensor 156. The sensor may be referred to as 2.5D since, unlike 3D, the 2.5D sensor 156 does not obtain a full 3D picture. Instead, the 2.5D sensor 156 only obtains a slice of data at a specific height (e.g., a 2D scan of range) at the approximate height of the sensor (or at least at the height at which the sensor transmits energy). Additionally, for a true 3D scan, two sensors would be required to get the front perspective and back perspective view of objects. Also, the 3D scan would have a continuous picture developed along the height dimension, whereas the 2.5D scan has limited view of the height dimension. The perspective problem can be at least partially mooted by virtue of the fact that if the 2.5D sensor 156 is mounted on a mobile platform (which the robotic mower 10 would clearly be), then multiple perspectives can be obtained.

In some embodiments, the 2.5D sensor 156 may be embodied as a LIDAR (laser imaging detection and ranging) device or a LEDDAR (light emitting diode detection and ranging) device. LEDDAR devices may be useful in some cases, since LEDDAR devices handle lighting changes fairly well, and outdoor environments often encounter vastly different lighting conditions based on the weather.

In some embodiments, the radio receiver 158 may include an ultra wide band (UWB) or other radio beacon for transmitting radio information that can be received and processed at the robotic mower 10 for positioning purposes. For example, the beacon (or beacons) may be at known positions (e.g., at the charge station 40 or other fixed locations) and triangulation may be accomplished based on range calculations to multiple beacons. Other radio ranging and/or positioning receivers (and/or transmitters) may also be incorporated into the radio receiver 158 in alternative embodiments.

In an example embodiment, the positioning module 60 may be configured to incorporate input from a plurality of sources (e.g., among sensor network 90 components that can generate an estimated position or cooperate to generate an estimated position) to generate a composite position based on the position information received from each of the various sources available. Thus, for example, each sensor (or at least multiple sensors) may provide separate information that can be used by the positioning module 60 to determine a corresponding position estimate. Each position estimate may also have a weight associated therewith based on time, accuracy estimates or other factors. The positioning module 60 may then calculate the composite position based on a weighted average of the individual position estimates from each respective source that has an input to provide. In some cases, predicted positions may further be determined based on current inputs, system model information and previous state information.

In some example embodiments, rather than (or in addition to) estimating a composite position, the positioning module 60 may be configured to rank or order position estimates based on a confidence score associated with each position input provided from the various sources available. The position estimate with the highest confidence score may then be selected as the current estimated position. Additionally or alternatively, the positioning module 60 may be configured to use one or more of the available sensors as a primary sensor for determining position. The positioning module 60 may also be configured to "reset" or update the primary sensor as appropriate if a more accurate position source becomes available (e.g., as in the example of resetting the IMU 150 when a more accurate position source is available).

In an example embodiment, the detection module 70 may be configured to employ sensors of the sensor network 90, the camera 95, and/or other information to detect objects and/or boundary features. Boundary detection may be accomplished by virtue of receiving a set of boundary coordinates or boundary positions and cooperating with the positioning module 60 to determine when the boundary coordinates or boundary positions have been reached. In other cases, boundaries may be established by having the robotic mower 10 trace out the boundaries and record its position while tracing the boundaries. After tracing the boundaries and recording the positions, the positions may be stored as the set of boundary coordinates or boundary positions. In other cases, a temporary boundary may be placed (e.g., via a wire or other temporary boundary), and the robotic mower 10 may operate and detect the temporary boundary coordinates or positions and store such information as the set of boundary coordinates or boundary positions. In still other example embodiments, the robotic mower 10 may be provided with a map of the parcel 20 and the map may be correlated to coordinates or positions that are detectable by the robotic mower 10. Boundaries may be identified on the map and converted into the set of boundary coordinates or boundary positions that can be used to bound the operation of the robotic mower 10.

Object detection may occur relative to static objects that may be fixed/permanent and non-moving, but also not fixed or permanent objects. Such objects may be known (if they have been encountered before at the same position) or unknown (if the present interaction is the first interaction with the object or a first interaction with an object at the corresponding location). Object detection may also occur relative to dynamic objects that may be moving. In some cases, the dynamic objects may also be either known or unknown. Classifications of known and unknown objects may be accomplished using the detection module 70 based on whether the same object has been detected in the same location, or based on machine learning relative to known images. For example, the detection module 70 (or processing circuitry 110) may store images of previously encountered objects or other objects that are to be learned as known objects. When an object is encountered during operation of the robotic mower 10, if the camera 95 is able to obtain a new image of the object, the new image can be compared to the stored images to see if a match can be located. If a match is located, the new image may be classified as a known object. In some cases, a label indicating the identity of the object may be added to the map data in association with any object that is known.

In an example embodiment, the robotic mower 10 may be configured to insert an offset or otherwise steer away from objects (and/or boundaries) to avoid collision with such objects. In some cases, the robotic mower 10 may be configured to come back to the location of an object at a later time to see if the object has moved if it is not a known fixed object. The object can therefore be learned to be a fixed object, or the object may have moved and the robotic mower 10 can then conduct its mowing operations where the object had been located. In any case, the detection module 70 may employ sensors of the sensor network 90 to ensure that the robotic mower 10 can identify and stay within boundaries. The detection module 70 may employ sensors of the sensor network 90 to also identify and/or avoid contact with objects on the parcel 20.

In an example embodiment, the mapping module 80 may be configured to operate in a map generation (or update) mode or in a navigation mode. In the map generation mode, the mapping module 80 may be configured to incorporate input from any available input sources of the sensor network 90 in order to account for current position of the robotic mower 10 and any detected objects or boundaries in order to generate a map of the parcel 20 (or portions thereof) responsive to traversal of the parcel 20 by the robotic mower 10. As such, the mapping module 80 may receive position information from the positioning module 60 and object/boundary detection information from the detection module 70 to generate map data that can be illustrated locally or remotely as a graphical display of a map of the parcel 20.

In some cases, the mapping module 80 may track position data (e.g., provided from the IMU 150 or another position source) and record object and/or boundary detection information relative to the position of the robotic mower 10 (e.g., from the 2.5D sensor 156, the camera 95, etc.) to generate the map data. The position data may also include information indicative of terrain features (e.g., bumps, hills, edges, etc.) that are detectable by the IMU 150, if applicable. Thus, the map data may, in some cases, provide a three dimensional (or at least 2.5D as discussed above) map of the parcel 20. However, in other cases, the map may be provided in only two dimensions.

Boundaries may be defined on the map along with any objects detected in any suitable form. In this regard, in some cases, the map data may be converted into a model or image of the parcel 20 that can be displayed to merely show objects and/or boundaries in a rudimentary form, or animation, graphic overlays, icons and/or other techniques may be employed to generate a sophisticated map view that may be exported to devices with more capable displays (e.g., the electronic device 42), or that may be displayed on a display device of the robotic mower 10 itself.

Figure 4:
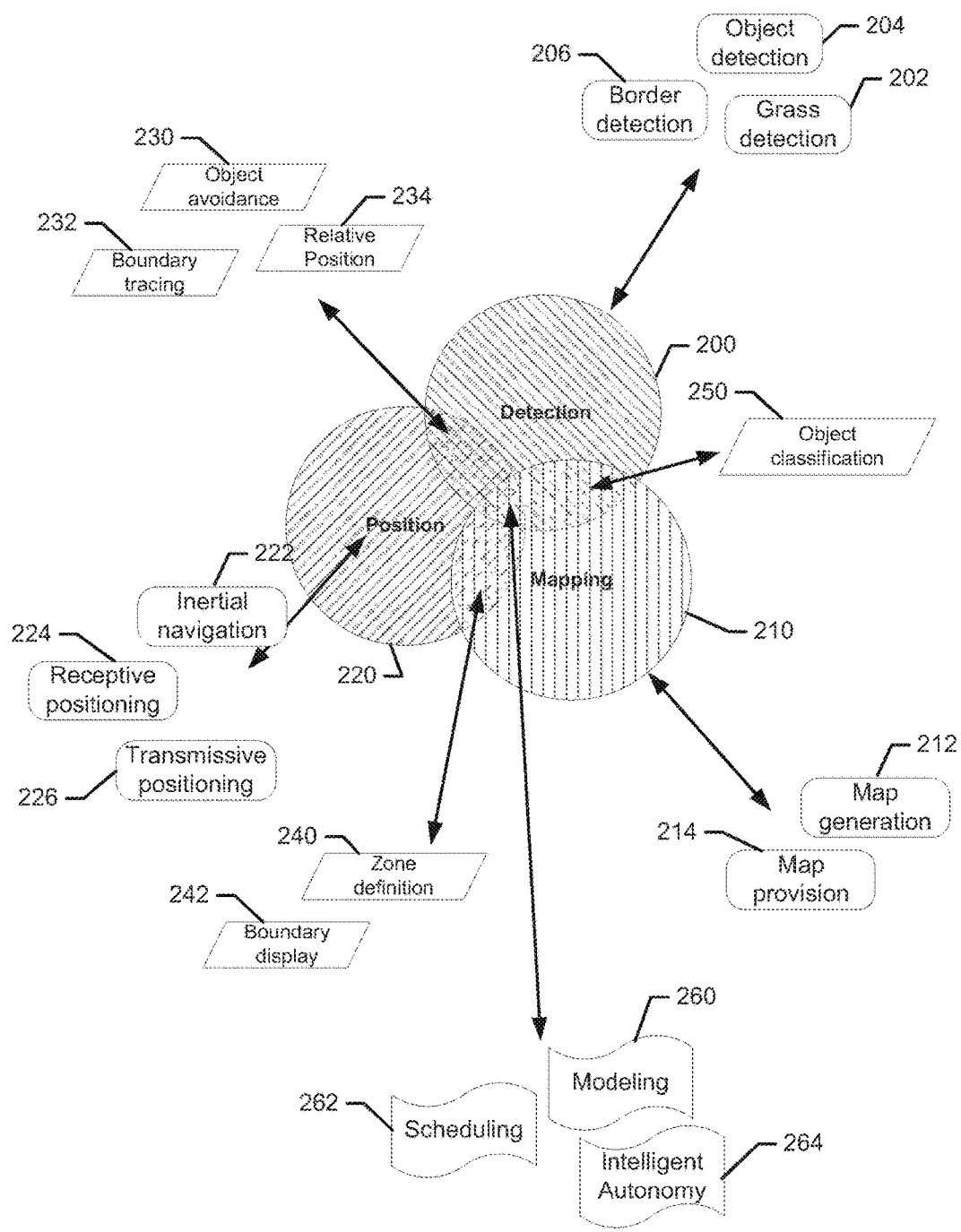
FIG. 4 illustrates a conceptual diagram of the functions associated with the various modules in accordance with an example embodiment.

By incorporating the sensor network 90 and the modules described above, the robotic mower 10 may be enabled to perform a plurality of functions without reliance upon a boundary wire and without necessarily bumping into objects. Accordingly, the robotic mower 10 may be substantially contactless robotic vehicle that can operate in defined boundaries without a boundary wire while performing a number of useful functions. FIG. 4 illustrates a conceptual diagram of the functions associated with the various modules in accordance with an example embodiment. In this regard, FIG. 4 illustrates a detection function 200, a mapping function 210 and a positioning function 220 that may be accomplished by the control circuitry 12 of the robotic mower 10. Each of these respective functional areas may be further inclusive of more specific functions that are also shown in FIG. 4, and that can be achieved by the hardware, software and sensors utilized in defining the detection module 70, the mapping module 80 and the vehicle positioning module 60, respectively. In this regard, the detection function 200 may include grass detection 202, object detection 204, and border detection 206, among others. As may be appreciated from the description above, grass detection 202 may be accomplished using the grass detector 154. In some cases, object detection 204 may be accomplished using the radio receiver 158 and/or the 2.5D sensor 156. Border detection 206 may be accomplished using any or all of the illustrated components of the sensor network 90 as shown in FIG. 3, either alone or in combination with each other. The mapping function 210 may include map generation 212 and map provision 214, among other functions. Map generation 212 may also any or all of the illustrated components of the sensor network 90 as shown in FIG. 3, either alone or in combination with each other to generate map data. Map provision may, in some cases, involve only the serving of a map to use in connection with various other functions. The positioning function may include inertial navigation 222, receptive positioning functions 224 and transmissive positioning functions 226. Inertial navigation 222 may be accomplished with the IMU 150. Receptive positioning functions 224 may be accomplished without transmission of energy, and may include the GPS receiver 152, the grass detector 154, the radio receiver 158 and/or the like. Transmissive positioning 226 may include any positioning technique that requires the transmission of energy from the robotic mower 10. Thus, for example, transmissive positioning 226 may be accomplished using the 2.5D sensor 156 and/or the radio receiver 158, among other possible ranging and/or non-contact sensing devices.

As shown in FIG. 4, the detection function 200, the mapping function 210 and the positioning function 220 may each include specific functions that are independent of other functions. However, in some cases, each of the functions may overlap with one or both of the other functions in order to define cooperative functions other be accomplished by the control circuitry 12 of the robotic mower 10. Each of these respective functional areas may be further inclusive of more specific functions that are also shown in FIG. 4, and that can be achieved by the hardware, software and sensors utilized in defining the detection module 70, the mapping module 80 and the vehicle positioning module 60, respectively. Some examples of cooperative functions are shown in FIG. 4 in association with the overlap areas in which they may fall in some cases. For example, the detection and positioning functions 200 and 220 may overlap relative to performing functions such as object avoidance 230, boundary tracing 232 and relative position determination 234. Detection and mapping functions 200 and 210 may overlap relative to performing object classification 250 (e.g., as temporary or fixed objects) in some cases. The mapping and positioning functions 210 and 220 may overlap relative to performance of such functions as zone definition 240, boundary display 242 and/or the like. Meanwhile, all three functions may overlap in some cases to provide more comprehensive cooperative functions such as modeling 260, scheduling 262 and/or intelligent vehicle autonomy 264, which may involve advanced functions.

Figure 5:
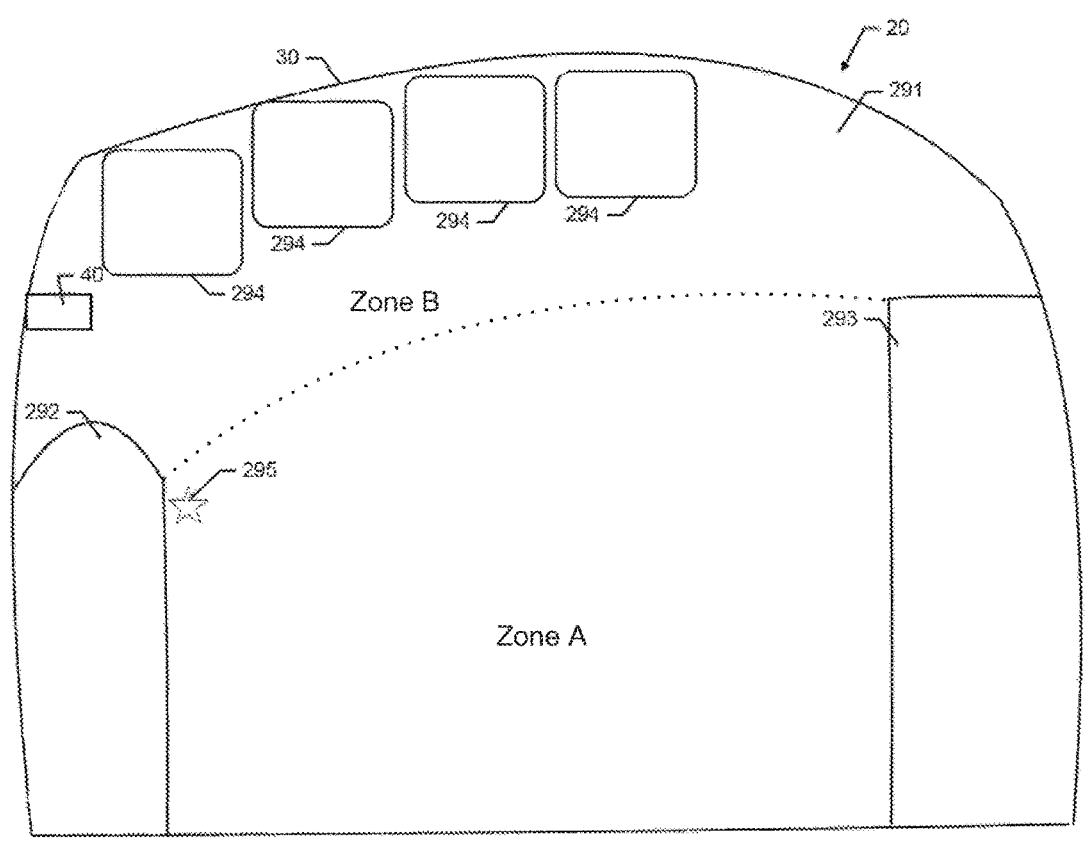
FIG. 5 illustrates an example of map data that may be defined to represent all or a portion of the parcel according to an example embodiment.

Modeling 260 may involve mapping functions 210 that employ positioning functions 220 and object detection 200 in order to generate a comprehensive map or model of the parcel 20. FIG. 5 illustrates a graphical representation of the parcel 20 generated into a map view in accordance with an example embodiment. The graphical representation of FIG. 5 is a 2D representation similar to a map view, but could easily be converted to 3D by the addition of topographical contour lines or other features (e.g., image views) to indicate features having a height dimension. The parcel 20 of FIG. 5 has the boundary 30 and charge station 40 indicated as described above. However, the parcel 20 also has a work area 291 defined along with a first exclusion area 292 and a second exclusion area 293. The first and second exclusion areas 292 and 293 may be designated by the operator as cultivated areas, or areas that are otherwise not grass and that the robotic mower 10 is to avoid. However, the work area 291 may be defined as an area that is to be mowed in its entirety. Various structures (e.g., bushes 294) are also represented, and may be appreciated by the robotic mower 10 as inaccessible areas due to the existence of a structure at the location.

The bushes 294 may be known objects. Similarly, in some cases, the first and/or second exclusion areas 292 and 293 may have borders defined by wooden, stone or other structures that may be known objects. One or more portions of the boundary 30 may also comprise known objects. However, other objects may also be encountered and/or displayed on the map. In this regard, an unknown object 295 is also shown in FIG. 5. As can easily be appreciated from FIG. 5, more detailed graphics regarding objects, boundaries and/or any other features of the parcel 20 may additionally or alternatively be provided. Moreover, in some cases, actual images may be provided with or accessible from the map view of FIG. 5.

The map view of FIG. 5 may be generated responsive to operation of the modules for modeling 260 as described above. However, the map view could also be pre-generated and supplied to the robotic mower 10 as an operational and/or navigational aid. After generation (or pre-generation), the map view may in any case be stored for use as an operational or navigation aid in some embodiments. In some cases, borders, boundaries and/or the like may be defined in connection with modeling 260, e.g., by tracing borders or boundaries on a graphical display and converting the traced borders/boundaries into corresponding coordinate values that may form a geographic fence or define different zones or sub-zones.

The map view may also be useful as an operational or navigation aid in the context of scheduling 262. In this regard, once zones and/or boundaries are defined the robotic mower 10 can be assigned to perform corresponding tasks in or with respect to areas inside the boundaries or in assigned zones. Thus, for example, FIG. 5 illustrates two zones (Zone A and Zone B), but it should be appreciated that many more could be defined. The robotic mower 10 may be enabled to determine its position relative to being within Zone A or Zone B. If desired, the robotic mower 10 may further be enabled to keep within Zone A or Zone B in accordance with scheduling or other programming instructions provided to the robotic mower. When provided with a schedule, the robotic mower 10 may operate in whichever zone it is scheduled to be in at a given time.

As indicated above, the robotic mower 10 may also be configured to utilize the sensor network 90 and modules described above to engage in other functions indicative of intelligent vehicle autonomy 264. In this regard, for example, different tasks may be defined relative to different zones or at different times. For example, Zone A be identified for mowing (or not mowing) at one specific time that may be selectable by the user, and Zone B may be identified for mowing at a different user selectable time. In some cases, the user may be enabled to see the map view on a device (e.g., the electronic device 42) and select zones, a scheduling menu, autonomous operation settings, or other interaction mechanisms to define tasks for certain zones at certain times. Instructions may be provided to mow at different times, at different heights, in specific patterns, or with selected frequency in each respective zone. Alternatively or additionally, in embodiments where a robotic vehicle other than the robotic mower 10 is employed for performing tasks on the parcel 20, the robotic vehicle can be configured to autonomously traverse the parcel 20 to check soil conditions, monitor the health of grass or other plants, direct the application of water, fertilizer, chemicals, etc., or engage in other programmed activities.

Accordingly, the robotic mower 10 (or other robotic vehicle) may be provided with the positioning module 60, the detection module 70, and the mapping module 80 to process sensor data received from the sensor network 90 and/or the camera 95. The robotic mower 10 may therefore be capable of accurately determining its position and gathering information about its surroundings. With accurate position determining capabilities, and the ability to experience its surroundings with multiple sensors, the robotic mower 10 may be configurable to operate without any boundary wires, and avoid bumping into objects. Additionally or alternatively, the robotic mower 10 may be configurable to generate and interact with accurate maps.

Map generation in accordance with some embodiments, may be accomplished using simultaneous localization and mapping (SLAM). Accurate localization along with accurate pose estimation can be used to generate a map. However, providing a reference for the data being gathered is important. In some cases, one or more landmarks may be provided as reference points. The landmarks may be walls, fences, corners formed by vegetation and/or structures, specific objects and/or the like. In an example embodiment, the mapping module 80 may be configured to employ range sensors (e.g., LIDAR, LEDDAR, etc. of the 2.5D sensor 156) to record ranges to objects or features while monitoring position via the IMU 156. However, other positioning sources could be additionally or alternatively used.

Figure 6:
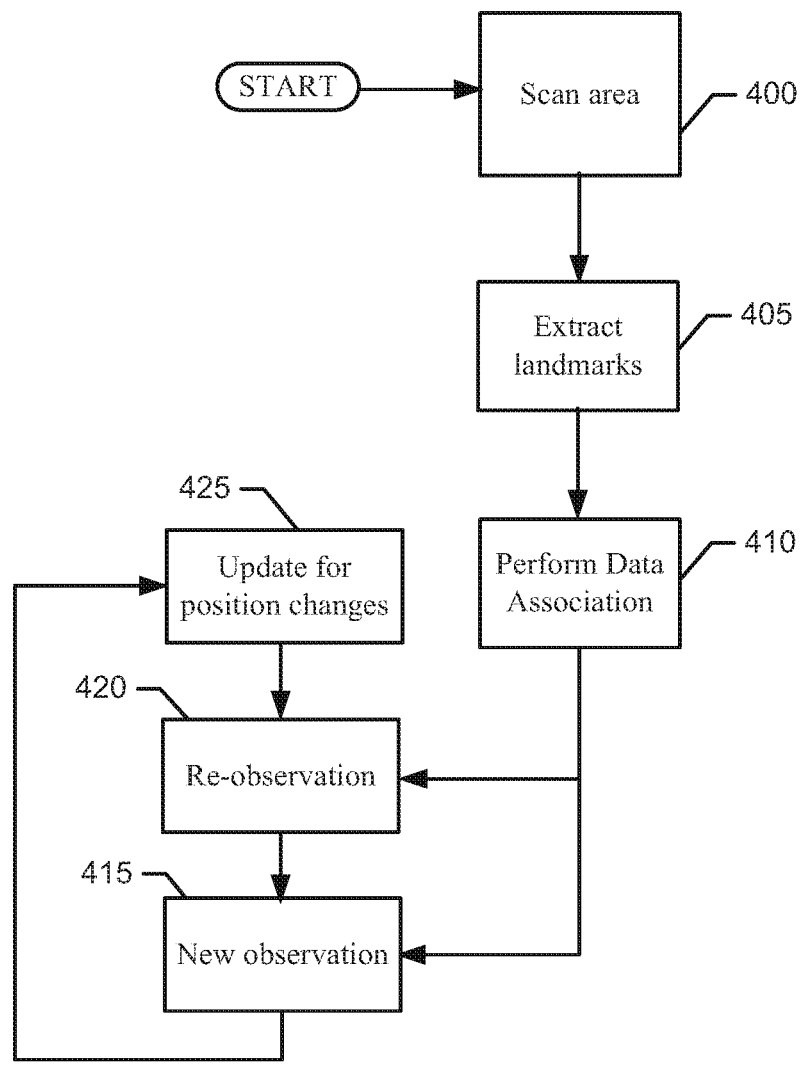
FIG. 6 illustrates a control flow diagram of one example of how the robotic mower can be operated to build a probability based map in accordance with an example embodiment.

FIG. 6 illustrates a block diagram of a method for employing SLAM for gathering data for map generation in accordance with an example embodiment. As shown in FIG. 6, the method may include scanning an area at operation 400. The scanning may be accomplished using the camera 95 (e.g., visually scanning), via the 2.5D sensor 156, or via any other suitable scanning device. At operation 405, landmarks may be extracted from the scan results. Thereafter data association may be accomplished to associate data relative to the landmarks at operation 410. New observations (at operation 415) and re-observations (at operation 420) may be recorded as the robotic mower 10 continues to traverse the parcel 20, and those observations may be recorded within the context of the known landmark positions. As the position of the robotic mower 10 changes, the IMU 150 (or other position source) may continuously update position information at operation 425. Re-observations and new observations of objects and/or areas are then continuously updated along with the updating of the position so that, over time, the map can be continuously build and/or updated.

As an alternative (or in addition) to using SLAM in the manner described above while employing ranging sensors, some example embodiments may employ visual SLAM.

Thus, for example, the camera 95 may be employed as the sensor. In such an embodiment, the IMU 150 may be used to provide inertial navigation information. However, input from the camera 95 could also or alternatively be employed to measure optical flow to determine motion of the robotic mower 10. As such, for example, image data of sequential image frames can be analyzed to detect changes in pixels between frames. Movement of the robotic mower 10 can be detected based on these detected pixel changes. This can improve pose estimation in environments with sufficient image features for tracking. The image features may also serve as landmarks that can provide anchor points for referencing pose estimation and position, either alone or in combination with another positioning source (e.g., the IMU 150).

In an example embodiment, the mapping module 80 may store position information (e.g., in a database such as memory 114) as a history of robotic mower 10 position. Thus, each position estimate (or composite estimate) may be stored in association with the time at which the position was determined or estimated. The mapping module 80 may also store other sensor data correlating with each position determined and/or each time at which a position is determined. The mapping module 80 may also be configured to generate map data based on the position, sensor and any other historical information that is stored.

As can be appreciated from the description above, depending on the types of sensors employed in the sensor network 90, there may be a rich capability for mapping. In this regard, for example, if multiple sensors are used for gathering position information (e.g., IMU, GPS, RF, optical flow, etc.) then position estimates may be averaged or the best position information source may be selected to define each position. In cases where sensor data includes information indicative of object detection, detection of the same object by different sources and/or at different times can be correlated so that contours of the object (perhaps even from different angles and/or perspectives) can be more accurately represented and mapped. Additionally, given that some sensors of the sensor network 90 can detect other features or information (e.g., color, chlorophyll, etc.), the map data and corresponding map generated may be further augmented to include such information.

In some example embodiments, the mapping module 80 may be configured to employ probabilistic mapping. In this regard, recorded data such as position information and sensor data may be used to generate confidence scores or probability scores associated with each piece of information or data. Thus, for example, each position estimate may have a confidence score (or weight, as indicated above), pose estimation may be accompanied with confidence scores, object classification (or identification) may be accompanied with confidence scores, grass detector determinations may have corresponding confidence scores, and so on. In some embodiments, features, parameters or characteristics that have a confidence score below a threshold may not be represented on any generated map. However, since information may be stored as a history or in a cumulative fashion, confidence scores can build (or decrease) over time. Each subsequent potential detection at the same location can be correlated to prior potential detections to obtain cumulative confidence scores. Thus, when the confidence score for a given feature reaches the threshold, the given feature may be mapped. Thus, the mapping module 80 may essentially perform an integration of sensor data over time.

In an example embodiment, the grass detector 154 may be configured to detect various features that may be indicative of grass (as described above) or other features. The camera 95 may also provide image data of the same areas or objects examined by the grass detector 154. By employing the grass detector 154 data and image data from the camera 95, the mapping module 80 may be configured to assign a probability that particular areas are grass, rocks, mulch, pavement, asphalt, or other ground cover features. Similarly, the 2.5D sensor 156 may provide data that can be used to classify various features, and in some cases, this data may be combinable with image data from the camera 95 to supply the mapping module 80 with sufficient data to assign a probability to various objects or features as to their classification. For example, an object may be classified relative to a probability of being a tree, a bush, a flower, a fence, and/or the like. In each instance, machine learning of the mapping module 80 relative to comparing current images to a library of known objects or features may be employed.

In an example embodiment, the mapping module 80 may be configured to generate map data in real-time (or substantially in real-time). Thus, for example, the mapping module 80 may generate map data while the robotic mower 10 is traversing the parcel 20. Flat terrain and various objects and features may therefore be "painted" onto a map or otherwise recorded in a database to enable later painting of the map. In other words, the robotic mower 10 may map the parcel 20 the first time the robotic mower 10 transits the parcel 20. In some cases, the robotic mower 10 may be given coordinates, landmarks or other temporary indicators of the borders of the parcel 20 and may "fill in" details of features on the parcel 20 by mapping as described herein. Alternatively, the robotic mower 10 may be directed, locally or remotely, to trace the borders and then fill in details of features on the parcel 20 by mapping as described herein. In any case, the mapping module 80 may gather map data that can be used locally at the mapping module 80 for map generation, or which can be exported to another device for map generation.

By employing probabilistic mapping, the mapping module 80 may be dynamically updateable and responsive to changes in the features present in or proximate to the parcel 20. Thus, for example, certain features that are seasonally dynamic may be automatically adjusted over time and reflected in maps generated using the mapping module 80. It can therefore be appreciated that although the mapping module 80 could simply be employed one time to generate a map of the parcel 20 (like the map of FIG. 5), it may further be desirable to employ the mapping module 80 at various times after initial map generation to update the map and/or confirm the accuracy of any map previously generated by or supplied to the mapping module 80.

In some embodiments, VSLAM may be combined with probabilistic mapping and other sensors may not be needed. Thus, for example, the camera 95 could be the lone or single sensor used for map generation in some cases. Image data may be used to perform pose estimation and position estimation relative to reference features using optical flow and other image based positioning techniques. The image data may also be used in connection with machine learning to classify objects and features such as grass or other ground cover, and various objects that may also be encountered. Accordingly, although very accurate maps could be achieved through sensor fusion of sensor data from many different sensors, it may also be possible to employ probabilistic mapping with only a single sensor. Even such a single sensor embodiment can be used to generate maps in real-time.

Embodiments of the present invention may therefore be practiced using an apparatus such as the one described in reference to FIGS. 1-4. However, it should also be appreciated that some embodiments (or aspects thereof) may be practiced in connection with a computer program product for performing embodiments of the present invention. As such, for example, each block or step of the flowcharts of FIGS. 7 and 8, and combinations of blocks in the flowcharts, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 114) and executed by processing circuitry (e.g., processor 112).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Figure 7:
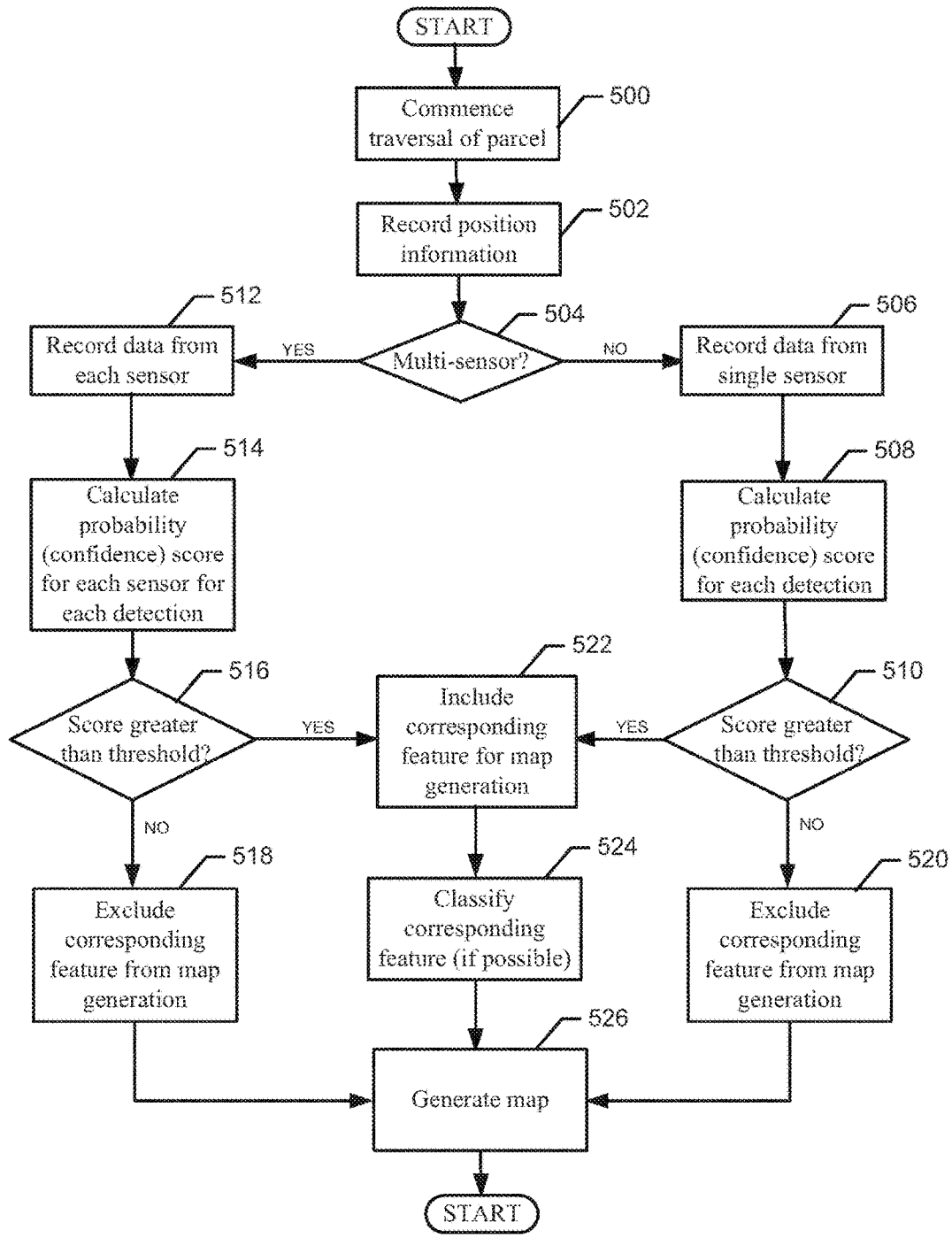
FIG. 7 illustrates a control flow diagram of one example of how the robotic mower can be operated to build a probability based map in accordance with an example embodiment.

FIG. 7 illustrates a control flow diagram of one example of how the mapping module 80 may generate a map in accordance with an example embodiment. As shown in FIG. 7, operation may begin with commencement of parcel traversal by the robotic mower 10 at operation 500. During the traversal, position information may be recorded periodically, at various intervals, continuously, and/or in response to trigger events at operation 502. A determination may then be made as to whether sensor data is received (or receivable) from one or multiple sensors at operation 504. If there is only a single sensor, then data received from the single sensor may be recorded at operation 506. The recordation of the data may be made in association with a given position and/or a time at which the data was recorded. Thereafter, at operation 508, a determination may be made as to a probability (or confidence) score of the data received from the sensor. Then a determination may be made, at operation 510, as to whether the probability score is greater than a threshold. If multiple sensors are used and/or are providing data, then the data may be recorded from each sensor at operation 512, and probability scores may be determined for each item of sensor data received at operation 514. Each probability score may then be compared to the threshold associated with each sensor (as the thresholds may be sensor-specific) at operation 516. If the determinations at operations 510 and 516 affirm that the probability score is greater than the threshold, then the corresponding feature may be included, flagged or otherwise accepted for map generation at operation 522. Any features selected for inclusion may then be classified (if possible) at operation 524.

Of note, the inclusion operation only applies to individual features that have probability scores above the threshold and it is possible that some features may be included while others are not. When the probability score (or scores) are below the threshold, then the corresponding feature (or features) is excluded from map generation at operations 518 and 520, respectively. Finally, the map is generated at operation 526. Of note, since real-time operation is supported, the map generation may not be complete, but may only include data proximate to the current position and flow may cycle back to the start for further cycling and map building as the robotic mower 10 completes traversal of the parcel 20.

Of note, the processes above may incorporate all of mapping, position determining and object detection, which can be accomplished based on the inclusion of the sensor network 90 and the modules described above. As such, in some cases, the robotic mower 10 may generally generate map data in accordance with a method that combines the modules described above to provide a robust mapping capability. In this regard, a method according to example embodiments of the invention may include any or all of the operations shown in FIG. 8. Moreover, other methods derived from the descriptions provided herein may also be performed responsive to execution of steps associated with such methods by a computer programmed to be transformed into a machine specifically configured to perform such methods.

Figure 8:
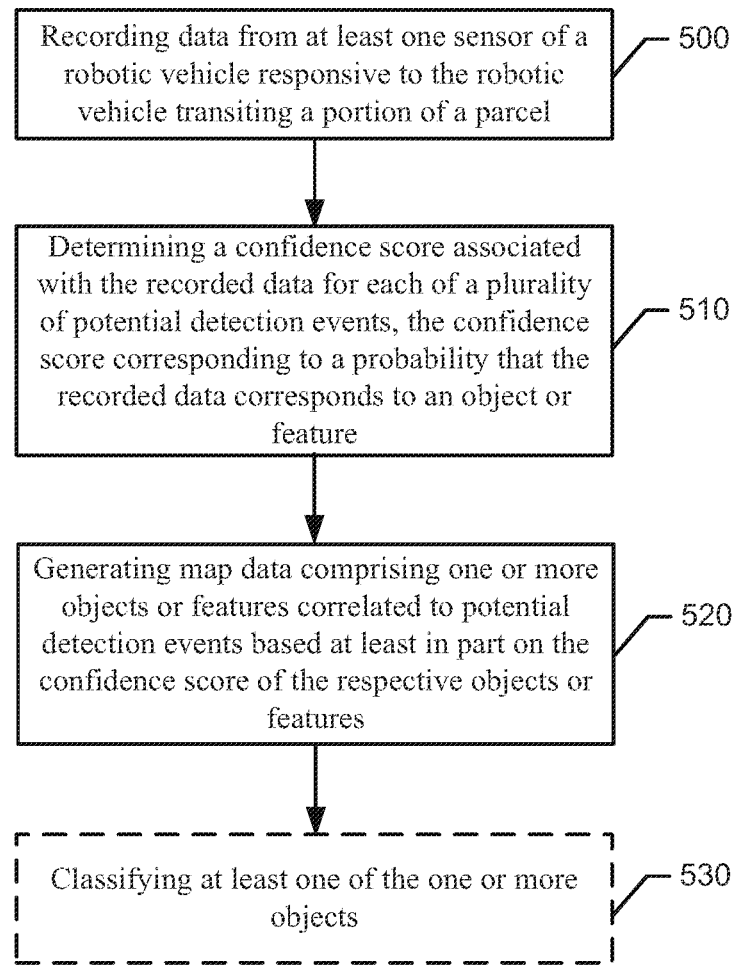
FIG. 8 illustrates a block diagram of a method of operating a robotic mower to build a probabilistic map according to an example embodiment.

In an example embodiment, a method for defining boundaries for a work area of a robotic vehicle (e.g., a mower or watering device), as shown in FIG. 8, may include recording data from at least one sensor of a robotic vehicle responsive to the robotic vehicle transiting a portion of a parcel at operation 500 and determining a confidence score associated with the recorded data for each of a plurality of potential detection events at operation 510. The confidence score may correspond to a probability that the recorded data corresponds to an object or feature. The method may further include generating map data comprising one or more objects or features correlated to potential detection events based at least in part on the confidence score of the respective objects or features at operation 520.

The method may include additional optional operations, or some of the operations may be augmented or modified in some cases. For example, in some cases, the method may further include optional operation 530 of classifying at least one of the one or more objects. Classifying the at least one of the one or more objects may include comparing an image of the at least one of the one or more objects to known images to determine whether the image matches a known image of a classified object. Alternatively or additionally, classifying the at least one of the one or more objects may include determining whether the at least one of the one or more objects corresponds to grass. In some cases, recording data may include recording data from a single object detection sensor indicative of potential detected objects or recording data from each of a plurality of sensors relative to each potential detection event. In an example embodiment, the plurality of sensors may include at least a positioning device and an object detection device. Moreover, in some cases, the positioning device may be an inertial measurement unit or a GPS receiver, and the object detection device may be a 2.5D sensor. The 2.5D sensor may be embodied as a mobile time-of-flight measurement device. In an example embodiment, determining the confidence score further may include recording an initial confidence score for an initial detection and an updated confidence score responsive to a second potential detection event at a same location as the initial detection. In some examples, generating the map data may include comparing the confidence score of the one or more objects or features to a threshold and providing for inclusion of the corresponding one or more objects in a generated map responsive to the confidence score exceeding the threshold.

In an example embodiment, an apparatus for performing the method of FIGS. 6-8 above may comprise a processor (e.g., the processor 112) configured to perform some or each of the operations (400-530) described above. The processor 112 may, for example, be configured to perform the operations (400-530) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-530 may comprise, for example, the control circuitry 12. Additionally or alternatively, at least by virtue of the fact that the processor 112 may be configured to control or even be embodied as the control circuitry 12, the processor 112 and/or a device or circuitry for executing instructions or executing an algorithm for processing information as described above may also form example means for performing operations 400-530.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic vehicle comprising:
   one or more functional components configured to execute a lawn care function;
   a sensor network comprising one or more sensors configured to detect conditions proximate to the robotic vehicle; and
   processing circuitry configurable to cause:
   recording data from at least one sensor of a robotic vehicle responsive to the robotic vehicle transiting a portion of a parcel;
   determining a confidence score associated with the recorded data for each of a plurality of potential detection events, the confidence score corresponding to a probability that the recorded data corresponds to an object or feature;
   generating map data comprising one or more objects or features correlated to potential detection events based at least in part on the confidence score of the respective objects or features; and
   determining the confidence score by recording an initial confidence score for an initial detection and an updated confidence score responsive to a second potential detection event at a same location as the initial detection.

2. The robotic vehicle of claim 1, wherein the plurality of sensors comprise at least a positioning device and an object detection device.

3. The robotic vehicle of claim 2, wherein the positioning device comprises an inertial measurement unit or a GPS receiver, and wherein the object detection device comprises a 2.5D sensor.

4. The robotic vehicle of claim 3, wherein the 2.5D sensor comprises a mobile time-of-flight measurement device.

5. The robotic vehicle of claim 1, wherein the processing circuitry is configured for generating the map data by comparing the confidence score of the one or more objects or features to a threshold and providing for inclusion of the corresponding one or more objects in a generated map responsive to the confidence score exceeding the threshold.

6. The robotic vehicle of claim 1, wherein the processing circuitry is further configured for classifying at least one of the one or more objects.

7. The robotic vehicle of claim 6, wherein the processing circuitry is configured for classifying the at least one of the one or more objects by comparing an image of the at least one of the one or more objects to known images to determine whether the image matches a known image of a classified object.

8. The robotic vehicle of claim 6, wherein the processing circuitry is configured for classifying the at least one of the one or more objects comprises determining whether the at least one of the one or more objects corresponds to grass.

9. A method executable by processing circuitry disposed in a robotic vehicle, the method comprising:
   recording, via the processing circuitry, data from at least one sensor of the robotic vehicle responsive to the robotic vehicle transiting a portion of a parcel;
   determining, via the processing circuitry, a confidence score associated with the recorded data for each of a plurality of potential detection events, the confidence score corresponding to a probability that the recorded data corresponds to an object or feature; and
   generating, via the processing circuitry, map data comprising one or more objects or features correlated to potential detection events based at least in part on the confidence score of the respective objects or features,
   wherein determining the confidence score comprises recording an initial confidence score for an initial detection and an updated confidence score responsive to a second potential detection event at a same location as the initial detection.

10. The method of claim 9, wherein the plurality of sensors comprise at least a positioning device and an object detection device.

11. The method of claim 9, wherein generating the map data comprises comparing the confidence score of the one or more objects or features to a threshold and providing for inclusion of the corresponding one or more objects in a generated map responsive to the confidence score exceeding the threshold.

12. The method of claim 9, further comprising classifying at least one of the one or more objects.

13. The method of claim 12, wherein classifying the at least one of the one or more objects comprises comparing an image of the at least one of the one or more objects to known images to determine whether the image matches a known image of a classified object.

14. The method of claim 12, wherein classifying the at least one of the one or more objects comprises determining whether the at least one of the one or more objects corresponds to grass.

15. A method comprising:
 recording data from at least one sensor of a robotic vehicle responsive to the robotic vehicle transiting a portion of a parcel;
 determining a confidence score associated with the recorded data for each of a plurality of potential detection events, the confidence score corresponding to a probability that the recorded data corresponds to an object or feature; and
 generating map data comprising one or more objects or features correlated to potential detection events based at least in part on the confidence score of the respective objects or features,
 wherein determining the confidence score comprises recording an initial confidence score for an initial detection and an updated confidence score responsive to a second potential detection event at a same location as the initial detection,
 wherein the plurality of sensors comprise at least a positioning device and an object detection device, and
 wherein the positioning device comprises an inertial measurement unit or a GPS receiver, and wherein the object detection device comprises a 2.5D sensor.

16. The method of claim 15, wherein the 2.5D sensor comprises a mobile time-of-flight measurement device.

* * * * *